(12) United States Patent
Trümper et al.

(10) Patent No.: US 11,111,021 B2
(45) Date of Patent: Sep. 7, 2021

(54) TEMPERATURE REGULATING SYSTEM FOR A GALLEY COMPARTMENT OF AN IN-FLIGHT KITCHEN

(71) Applicant: Airbus Operations GmbH, Hamburg (DE)

(72) Inventors: Torsten Trümper, Hamburg (DE); Ekkehard Lohse, Buchholz (DE); Christian Schaarschmidt, Stade (DE)

(73) Assignee: Airbus Operations GmbH, Hamburg (DE)

(*) Notice: Subject to any disclaimer, the term of this patent is extended or adjusted under 35 U.S.C. 154(b) by 224 days.

(21) Appl. No.: 15/873,154

(22) Filed: Jan. 17, 2018

(65) Prior Publication Data

US 2018/0201374 A1 Jul. 19, 2018

(30) Foreign Application Priority Data

Jan. 18, 2017 (DE) ...................... 10 2017 200 734.6

(51) Int. Cl.
*F25B 21/02* (2006.01)
*B64D 11/04* (2006.01)
*F25B 21/04* (2006.01)
*F25D 17/06* (2006.01)
*A47J 39/02* (2006.01)
(Continued)

(52) U.S. Cl.
CPC ............... *B64D 11/04* (2013.01); *A47J 39/02* (2013.01); *B64D 13/08* (2013.01); *F25B 21/04* (2013.01);
(Continued)

(58) Field of Classification Search
CPC ...... F25B 21/02; F25B 21/04; F25B 2321/02; F25B 2321/021; F25B 2321/0212
See application file for complete search history.

(56) References Cited

U.S. PATENT DOCUMENTS 7,467,520 B2 * 12/2008 Van Loon ............... A47B 31/02
62/3.6
7,780,114 B2   8/2010 Doebertin et al.
(Continued)

FOREIGN PATENT DOCUMENTS

DE          43 08 144 C1    10/1994
DE    60 2004 010 886 T2     5/2008
(Continued)

OTHER PUBLICATIONS

German Search report for Application No. 10 2017 200 734.6 dated Oct. 24, 2017.

*Primary Examiner* — Brian M King
(74) *Attorney, Agent, or Firm* — Jenkins, Wilson, Taylor & Hunt, P.A.

(57) ABSTRACT

A temperature regulating system for at least one galley compartment for an in-flight kitchen which is intended for installing in a transport apparatus or vehicle, especially in an aircraft, includes a controllable cooling and heating element, which is designed for selectively cooling or heating a specified section of the cooling and heating element, and a heat-insulating partitioning wall, which at least partially adjoins an encompassing side edge of the cooling and heating element and encloses the specified section of the cooling and heating element. The heat-insulating partitioning wall is designed for separating an interior space of the galley compartment from an interior of a section of a fluid duct which extends in the in-flight kitchen.

4 Claims, 4 Drawing Sheets

(51) Int. Cl.
*B64D 13/08* (2006.01)
*F25B 29/00* (2006.01)
*F25D 23/12* (2006.01)
*F25D 31/00* (2006.01)
F25B 1/00 (2006.01)
F25D 23/00 (2006.01)
B64D 13/06 (2006.01)

(52) U.S. Cl.
CPC ............ *F25B 29/003* (2013.01); *F25D 17/06* (2013.01); *F25D 23/12* (2013.01); *F25D 31/005* (2013.01); B64D 2013/0629 (2013.01); F25B 1/00 (2013.01); F25B 2321/0251 (2013.01); F25D 23/003 (2013.01); F25D 2317/067 (2013.01); F25D 2700/12 (2013.01)

(56) References Cited

U.S. PATENT DOCUMENTS

2005/0153271 A1* 7/2005 Wenrich ............... A01N 1/0247
　　　　　　　　　　　　　　　　　　　　　435/1.1
2015/0121899 A1* 5/2015 Nakajima ............... F25B 21/04
　　　　　　　　　　　　　　　　　　　　　62/3.3

FOREIGN PATENT DOCUMENTS

| DE | 102006023047 B4 | 1/2010 |
| DE | 102015210268 A1 | 12/2016 |
| GB | 2 165 041 A | 4/1986 |
| WO | WO 2016/193378 A1 | 12/2016 |
| WO | WO 2017/173130 A1 | 10/2017 |

* cited by examiner

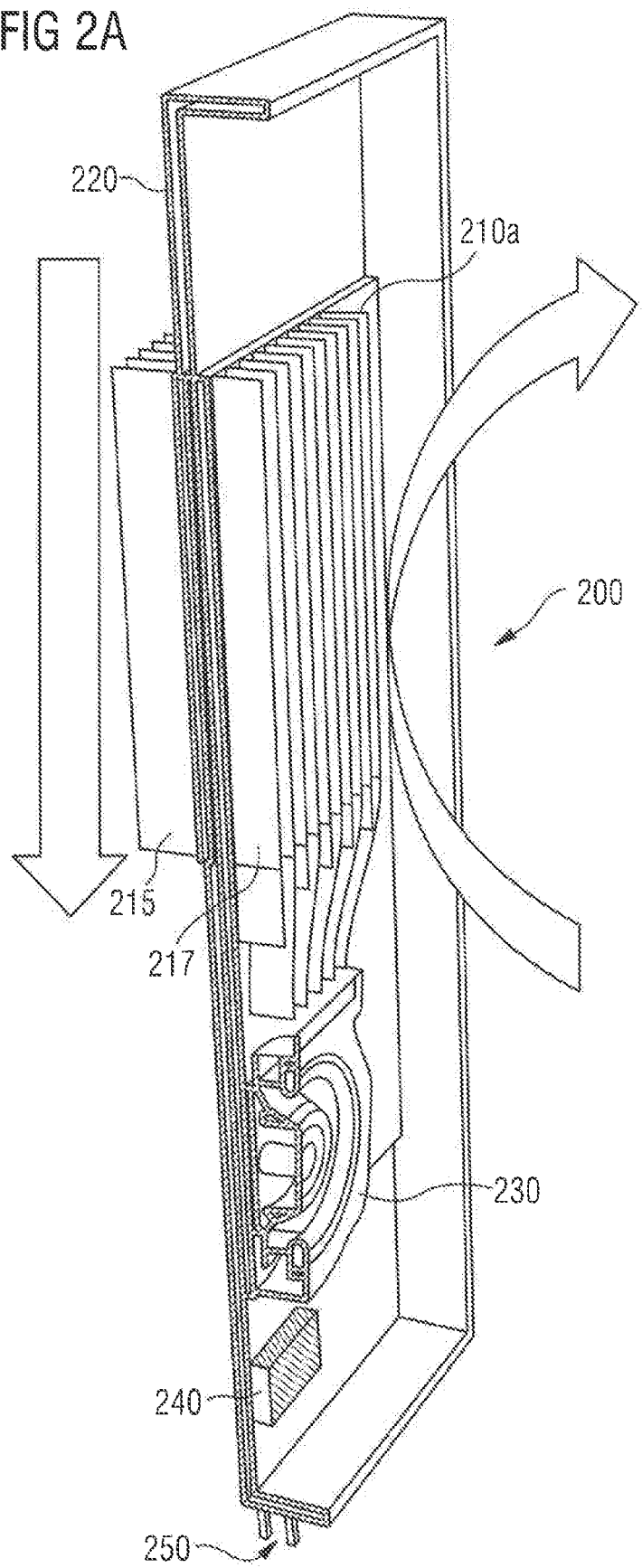

TEMPERATURE REGULATING SYSTEM FOR A GALLEY COMPARTMENT OF AN IN-FLIGHT KITCHEN

CROSS-REFERENCE TO RELATED APPLICATION

This application claims priority to German Patent Application DE 10 2017 200 734.6 filed Jan. 18, 2017, the entire disclosure of which is incorporated by reference herein.

TECHNICAL FIELD

The disclosure herein relates to a temperature regulating system for a galley compartment for an in-flight kitchen which is intended for installing in a transport apparatus or vehicle, especially for example in an aircraft. The disclosure herein also relates to a galley compartment which is equipped with such a temperature regulating system and also to an in-flight kitchen which is equipped with such a temperature regulating system.

BACKGROUND

Modern passenger aircraft are customarily equipped with in-flight kitchens, so-called galleys, which are known for example from DE 10 2006 023 047 B4 or U.S. Pat. No. 7,780,114, B2. As a rule, the galleys have a body with a substructure which is delimited or defined by a worktop and also upper compartments which are arranged above the worktop. Usually accommodated in the upper compartments of the galley are kitchen appliances such as coffee machines, water boilers, ovens, etc., and also drinks and foodstuff. Arranged in the substructure of the galley on the other hand is a customarily cooled galley compartment for accommodating mobile trolleys which are loaded with objects, such as drinks and foodstuffs, which are provided for handing out to the passengers on board the aircraft.

A cooling system, which comprises a cooling device which is installed in the region of a sidewall of an in-flight kitchen or integrated into a sidewall of the in-flight kitchen, is known from DE 10 2015 210 268 A1 and WO 2016/193378 A1. Alternatively, the cooling device is installed in the region of an intermediate wall or is integrated into an intermediate wall which divides a substructure of the in-flight kitchen into a first and a second section. Fluid ducts of the cooling device, which thermally connect heat exchangers of the cooling device, through which flows a cooling medium, with the respective fluid, can comprise sections which are integrated in a worktop of the in-flight kitchen. The cooling device creates a cooled fluid, for example air, which is ducted through an outlet into an area, close to the floor, of the substructure of the in-flight kitchen and via a fluid inlet which is formed in an underside of the worktop is recirculated from the substructure into the cooling device.

The cooling of upper compartments of the galley is not provided in most cases since this would require an additional fluid duct from the cooling device into the area of the galley above the worktop, as a result of which valuable storage space or working space would be lost. Moreover, the cooling device would have to be of larger dimensions on account of another pressure drop as a result of additional fluid ducts and more thermal energy consumers. On the other hand, the aircraft operators, for example airlines, are always in need of more complex cool areas for care of the passengers. It is not unusual that aircraft have to be equipped with galley compartments which have adjustable temperatures or different temperature ranges. Therefore, in addition to the cooled trolley compartments for storing foodstuffs and ready-made meals at approximately 4° C., a refrigeration compartment with temperatures at around −18° C. and a wine cooler with a temperature range of between 8 and 12° C. are frequently not uncommon in a galley.

SUMMARY

The disclosure herein is based on an object of providing a use-optimized temperature regulating system with low installation complexity for an in-flight kitchen. The disclosure herein is also directed towards an object of specifying a use-optimized galley compartment equipped with such a temperature regulating system, and also a corresponding in-flight kitchen.

The objects are achieved by a temperature regulating system, a galley compartment, and an in-flight kitchen having features such as those disclosed herein.

A temperature regulating system for at least one galley compartment for an in-flight kitchen which is intended for installing in a transport apparatus or vehicle, especially for example in an aircraft, comprises a controllable cooling and heating element. The cooling and heating element is designed or configured for selectively cooling or heating a specified section of the cooling and heating element. In other words, the cooling and heating element creates a heat flow from one side of the cooling and heating element to another side. The direction of this heat flow can be reversed in the process.

Therefore, the cooling and heating element is for example a thermoelectric element. The thermoelectric element effects a heat flow from one side of the thermoelectric element to another side when an electric current flows in the thermoelectric element. By reversing the heat flow, (the polarity), the direction of the heat flow can be selectively altered. An example of a thermoelectric element is a so-called Peltier element, the principle of operation of which is based on the similarly named Peltier effect.

Alternatively to this, the cooling and heating element can be a refrigerating machine with two heat exchangers, ducts for a cooling medium and at least one valve in the ducts. The ducts of the refrigerating machine form a cooling medium circuit which can be altered by arrangement of the at least one valve. The refrigerating machine is especially designed so that by the at least one valve the cooling medium is selectively ducted through one of the two heat exchangers for heat absorption or heat release. In other words, the function of the two heat exchangers can be reversed. For example, a multiway valve (e.g. a four-way valve) or a plurality of valves can be arranged in the ducts of the refrigerating machine in order to selectively duct the cooling medium from a delivery device of the refrigerating machine to one of the two heat exchangers for heat release. Accordingly, the cooling medium is then ducted through a restrictor valve and into the other of the two heat exchangers for heat absorption. An exemplary refrigerating machine for use in the temperature regulating system is a compression-refrigerating machine which is operated with a two-phase refrigerant. The two-phase refrigerant changes the aggregate state from liquid to gaseous in one heat exchanger and conversely changes from gaseous to liquid in the other heat exchanger, as a result of which a more intense cooling can be achieved on account of the effect of evaporation heat.

The temperature regulating system also comprises a heat-insulating partitioning wall which at least partially adjoins an encompassing side edge of the cooling and heating element and at least partially encloses the specified section of the cooling and heating element. Cooling and heating elements can have a flat body which is circumferentially encompassed by a side edge or narrow side surface. Thermoelectric elements can especially be of a particularly flat design. For example, the heat-insulating partitioning wall, in the case of a rectangular cooling and heating element, can encompass this on at least two of its side edges, that is to say two of the four circumferentially arranged flat sides of the cooling and heating element. Alternatively, the cooling and heating element can also have a round, elliptical or other shape. The heat-insulating partitioning wall at least partially encompasses the encompassing side edge (side surface) of this cooling and heating element.

In order to be able to be installed in a particularly space saving manner, the heat-insulating partitioning wall lies in a plane which is defined by the cooling and heating element or is arranged at least in the main parallel to this plane. In other words, the heat-insulating partitioning wall has a cut-out in which the cooling and heating element is embedded in a flush manner. The entire heat-insulating partitioning wall does not have to extend continuously in one plane but can also comprise bends, recesses, projections, etc. Such forms of the heat-insulating partitioning wall can serve for example for the connecting or the accommodating of further elements of the temperature regulating system or of a galley compartment.

The heat-insulating partitioning wall can be designed or configured for separating an interior space of the galley compartment from an interior of a section of a fluid duct extending in the in-flight kitchen. The heat-insulating partitioning wall therefore separates the interior space of the galley compartment from the interior of a fluid duct section. Similarly, the cooling and heating element separates the interior space of the galley compartment from the interior of the fluid duct section since the cooling and heating element, on account of its embedment in the heat-insulating partitioning wall, forms a part of this partitioning wall. As a result of a thermal connecting of the cooling and heating element with a respective fluid on both sides of the partitioning wall and of the cooling and heating element, the temperature regulating system is able to produce a heat flow between the interior of the fluid duct system and the interior space of the galley compartment, and vice versa.

Since in the case of a thermoelectric element as a cooling and heating element only a voltage source has to be connected to the thermoelectric element, the installation of the temperature regulating system is very simple, i.e. the installation complexity of the temperature regulating system is very low. Similarly, a cooling and heating element which is designed as a refrigerating machine can also be premanufactured as a complete unit, wherein the two sections (sides) of the refrigerating machine form opposite sides thereof for heat absorption or heat release.

The temperature regulating system can be used with any optional unit which is to be installed in the aircraft construction, so-called Line Replaceable Units (LRU) or with any optional exchangeable unit, so-called Galley Inserts (GAIN). Also, it is possible that the temperature regulating system is used at a location of the vehicle other than a galley. A precondition is only that provision is made for a fluid duct via which the temperature regulating system can absorb or release heat and can affect the heat flow.

The temperature regulating system can furthermore comprise a delivery device which is arranged on a side of the partitioning wall facing the interior space of the galley compartment and is designed or configured for delivering a first fluid which is present in the galley compartment via the specified section of the cooling and heating element. The delivery device can be designed in the form of a fan which delivers the first fluid, for example air or another gas which is present in the interior space of the galley compartment, via the section of the cooling and heating element. In particular, the delivery device delivers the first fluid via a surface of the specified section of the cooling and heating element so that a temperature of the first fluid which is present in the interior space of the galley compartment is correspondingly adjusted to the temperature of the cooling and heating element on its side facing the interior space of the galley compartment.

The delivery device can also be designed or configured for controlling a speed at which the first fluid is delivered via the section of the cooling and heating element. As a result, the temperature of the total fluid in the interior space of the galley compartment, and therefore objects which are stored therein, can be altered and maintained at a desired temperature in an energy-efficient manner.

On the side of the cooling and heating element facing the section of the fluid duct, a delivery device is not required since a second fluid is moved in the fluid duct otherwise. In particular, provision is already made in an in-flight kitchen for fluid ducts, for example ducts for cooling devices, exhaust ducts, water supply pipes or similar fluid pipes which conduct liquids or gases which can be used for operation of the temperature regulating system. Consequently, weight and also space can be saved since an additional delivery device and its controlling are unnecessary.

Alternatively, on the side of the cooling and heating element facing the section of the fluid duct a second delivery device can also be installed. For example, if the second fluid does not flow in the fluid duct, or does not flow sufficiently, a second delivery device could ensure a sufficient thermal exchange between the cooling and heating element and the second fluid. This second delivery device can, however, be of smaller design than the first delivery device, since a specified basic fluid flow is to be assumed in the fluid duct.

The temperature regulating system can also comprise a first heat exchanger which is arranged on a side of the cooling and heating element facing the section of the fluid duct. The first heat exchanger is thermally connected to one side of the cooling and heating element, for example to a heat exchanger which is arranged on the side of the cooling and heating element. The first heat exchanger enables an improved transporting of heat between the cooling and heating element and the second fluid which flows in the section of the fluid duct. The heat exchanger can be designed or configured for example in the form of fins, plates or tubular elements.

Alternatively or additionally, the temperature regulating system can comprise a second heat exchanger which is arranged on a side of the cooling and heating element facing the interior space of the galley compartment. The second heat exchanger is also thermally connected to a side of the cooling and heating element. The second heat exchanger therefore enables an improved transporting of heat between the cooling and heating element and the first fluid which is present in the interior space of the galley compartment. The second heat exchanger can also be designed by fins or plates. Depending on the arrangement of the delivery device, the fins or plates can be arranged so that the delivery device delivers the first fluid along the fins or plates. Alternatively or additionally, tubular elements can also form at least a part of the heat exchanger, wherein the first fluid can flow through the interior spaces of the tubular elements.

The temperature regulating system can also comprise a control unit. Depending on the design of the cooling and heating element, the control unit can undertake different control functions. For example, when using a thermoelectric element the control unit can be designed or configured for applying a variable voltage to the thermoelectric element and altering the polarity of the voltage. The value of the voltage which is applied to the thermoelectric element determines the electric current flow through the thermoelectric element and therefore also the heat flow (transporting of heat) from one side of the thermoelectric element to another side thereof. Depending on the design of the thermoelectric element, a temperature difference of the two sides of the thermoelectric element of up to approximately 70 K (or even more) can be achieved. A change of the polarity of the voltage in this case allows one side of the thermoelectric element, for example the side facing the interior space of the galley compartment, to be either cooled or heated.

If, in contrast to this, a refrigerating machine is used as the controllable cooling and heating element, the control unit can be designed or configured for controlling at least one valve in a cooling medium duct of the refrigerating machine so that the cooling medium is selectively ducted through one of two heat exchangers for heat absorption or for heat release. For example, the control unit can control a (multi-) directional valve so that in a first position of the valve the cooling medium flows from a delivery device of the refrigerating machine through a first of the heat exchangers and in a second position of the valve flows from the delivery device through a second of the heat exchangers. Correspondingly, in the first position of the valve the cooling medium flows from a restrictor valve or expansion valve of the refrigerating machine through the second of the heat exchangers and in the second position of the valve flows from the restrictor valve or expansion valve through the first of the heat exchangers. By the same token, the control unit can control two or more valves at different points of the cooling medium circuit in order to correspondingly selectively allow the cooling medium to flow through the two heat exchangers.

The first fluid in the interior space of the galley compartment can therefore be cooled or heated to a specific temperature by the control unit. Depending on the temperature of the second fluid which flows through the section of the fluid duct, the temperature in the interior space of the galley compartment can easily be set to between −25° C. and +140° C. In this way, a multi-temperature compartment is provided, the interior of which can be used as a refrigeration area, cool area for foodstuff, cool area for drinks (for example wine), and also for heating liquids, meals, hand towels, etc.

As an option, an additional heating element can be arranged in the interior space of the galley compartment. As a result, temperatures in the interior space of the galley compartment of above +140° C., e.g. temperatures of between +140° C. and +220° C. can be achieved, which temperatures can be used especially for heating foodstuffs, such as baked products.

A galley compartment which can be controlled in such a way offers the advantage that the galley compartment can be used in different ways. Therefore, it is conceivable that foodstuff, ready meals and the like are stored in the galley compartment, wherein the temperature regulating system effects cooling of the interior space of the galley compartment. At a later point in time, the foodstuff, ready meals, etc. can be heated, which can be carried out by a simple controlling of the temperature regulating system and especially of the cooling and heating element (for example reversing the poles of the thermoelectric element or redirecting the cooling medium flow). Consequently, the storage space which is provided by the galley compartment can be utilized in an optimum manner.

It is also possible that such controlling (from cooling to heating and vice versa) can be preselected via a time switch. Thus, in a conventional galley of an aircraft, an oven would be empty during ground operations of the aircraft. After start-up, a flight attendant would have to put foodstuff from a cooled area (for example a trolley) into the oven and heat it there. Using the (time) controllable temperature regulating system disclosed here, the galley compartment can be used both as a cooled storage space and as an oven. In this way, specified working sequences can already be programmed beforehand and the temperature regulating system which is described here allows an optimized use of a galley compartment or other galley are, as a result of which more storage space is gained without increasing the installation complexity of a galley.

A further controlling possibility of the temperature regulating system can be carried out by radio frequency tags (e.g. identifications based on RFID technology). Therefore, foodstuff, ready meals or other objects can be equipped with such radio frequency tags on a packing. The radio frequency tags can contain information relating to the packed product, which the temperature regulating system reads out. This information can comprise only the presence of such an article in a simple form. As a result, the temperature regulating system can determine a number of products which are located in the galley compartment, and set a temperature in the interior space of the galley compartment over a time period which is dependent on the number of products. Therefore, the products can be heated in an energy-efficient manner. Furthermore, the radio frequency tags can contain information about a storage temperature. In this way, the temperature regulating system can establish whether the interior space of the galley compartment has to be deep-frozen (approximately −18° C.), cooled (approximately between 4 and 12° C.) and/or heated (more than 20° C.). By the same token, it is possible that the temperature regulating system, based on a target temperature which is read out from the radio frequency tags and a number of products in the galley compartment, can determine a time span which is required for achieving the target temperature of all the products. As a result, for example the effect of a large number of products (such as ready-made meals) being heated in an excessively short time and at an excessively high temperature, as a result of which many products are overheated, whereas others have still not reached the target temperature, can be prevented.

A galley compartment for an in-flight kitchen which is intended for installing in a transport apparatus or vehicle, especially for example in an aircraft, can comprise at least one such temperature regulating system. The galley compartment can also comprise a heat-insulating door for closing off an opening of the galley compartment.

In this case, the galley compartment can be delimited or defined by a partitioning floor and partitioning walls, whereas the temperature regulating system by its partitioning wall forms a rear wall and/or a part of a sidewall, a ceiling or a floor of the galley compartment. The heat-insulating door preferably forms a front boundary through which a user (for example a vehicle attendant) can access the interior space of the galley compartment. The temperature regulating system, which in this case is arranged in the rear wall and/or in the part of the sidewall of the galley compartment, allows an adjustment of the temperature in the interior space of the galley compartment.

Furthermore, the galley compartment can comprise a temperature sensor which is arranged in the interior space of the galley compartment. The temperature sensor serves for detecting an actual temperature of the first fluid in the interior space of the galley compartment. The signals and/or data which are delivered by the temperature sensor can be used by a control unit in order to adjust the temperature of the first fluid in the interior space of the galley compartment to a setpoint temperature and to maintain it.

Alternatively, or additionally, the galley compartment can also comprise a first presetting device, which is arranged on, or in the proximity of, the door for presetting a setpoint temperature for the interior space of the galley compartment. The presetting device can be designed in the form of a manually operable interface. In addition, the presetting device can comprise an indicating element on which is indicated the preset setpoint temperature (and optionally also the actual temperature).

In a further embodiment of the galley compartment, this can comprise a heat-insulating body. The heat-insulating partitioning wall of the temperature regulating system can be fastened on the heat-insulating body or be integrated therein. For example, the heat-insulating partitioning wall of the temperature regulating system can form a rear wall of the galley compartment, whereas the heat-insulating body can form sidewalls, a floor and a ceiling of the galley compartment. The heat-insulating body can also form at least parts of the front of the galley compartment. In a preferred embodiment, the heat-insulating door closes off a (front) opening of the body. The body can, however, also form at least parts of the rear wall of the galley compartment, whereas the partitioning wall of the temperature regulating system forms part of the rear wall and/or part of a sidewall, of the floor or of the ceiling of the galley compartment.

A thereby equipped galley compartment with a temperature regulating system can advantageously be completely removed from the in-flight kitchen. Therefore, the galley compartment can be used by another kitchen element, such as a coffee machine, an oven, a standard storage compartment, or the like. In this case, an electric connecting element can be arranged in the galley compartment so that during the positioning of the galley compartment in the in-flight kitchen an electrical connection to the corresponding connecting element of the in-flight kitchen can be created. For example, an electrical connecting element (in the form of a plug or a coupling) can be arranged on a rear wall of the in-flight kitchen in an area of the galley compartment, in which connecting element a corresponding electrical connecting element (in the form of a coupling or a plug), attached in the galley compartment, can effectively engage so that an electrical connection is created.

The heat-insulating partitioning wall and/or the heat-insulating body can be produced from any suitable material. For example, vacuum insulating panels consisting of plastic with a thickness (wall thickness) of between 1 cm and 3 cm, preferably 2 cm, are suitable for producing the heat-insulating partitioning wall and/or the heat-insulating body. Vacuum insulating panels which are especially suitable for this have a high heat transfer resistance of approximately 2 to 10 $(m^2*K)/W$ (square meters and kelvins per Watt), preferably 4 to 6 $(m^2*K)/W$ and especially preferably 5 $(m^2*K)/W$.

Furthermore, an in-flight kitchen can comprise such a temperature regulating system and a fluid duct which is exposed to throughflow by a second fluid. The heat-insulating partitioning wall of the temperature regulating system forms a part of a boundary which defines the section of the fluid duct. In other words, the partitioning wall of the temperature regulating system can be part of a wall of the fluid duct. The cooling and heating element of the temperature regulating system can be integrated in this fluid duct wall. Alternatively, the wall of the fluid duct can also be designed or configured for accommodating a part of the cooling and heating element and/or of the partitioning wall of the temperature regulating system. If, for example, a heat exchanger is provided on the cooling and heating element, the wall of the fluid duct can comprise an opening through which the heat exchanger (and optionally also a part of the cooling and heating element) projects into the fluid duct. In this case, a sealing element can extend on the edge of the opening in the wall of the fluid duct in order to avoid the escape of the second fluid from the fluid duct into the galley compartment or into other areas of the in-flight kitchen.

The in-flight kitchen can furthermore comprise a body. The body constitutes an outer boundary of the in-flight kitchen. Moreover, the in-flight kitchen can comprise at least one partitioning element which is arranged inside the body and divides a space defined by the body into at least two galley compartments. The body and/or the partitioning elements can be produced by panels of lightweight design (for example plastic or fibre-reinforced plastic).

The in-flight kitchen can also comprise an electric connecting element which is designed or configured for connecting the at least one temperature regulating system to an electric current source. The electric connecting element can comprise a plug-in connector. The electric connecting element can be arranged for example on a rear wall or on a partitioning element of the in-flight kitchen in the proximity of the galley compartment which is to be equipped with a temperature regulating system. The temperature regulating system can also comprise an electric connecting element which can be connected to the electric connecting element of the in-flight kitchen. For example, the temperature regulating system can have an electric connecting element in the form of a plug, whereas the electric connecting element of the in-flight kitchen is a coupling, a socket or similar connecting element.

The heat-insulating partitioning wall of the temperature regulating system can form at least a part of a rear wall of a galley compartment and/or at least a part of the partitioning element. Therefore, the heat-insulating partitioning wall with the cooling and heating element can be integrated into the rear wall of a galley compartment and/or into a part of a partitioning element or can be fastened therein. This allows a particularly space saving creation of an in-flight kitchen with a multi-temperature compartment.

In a further embodiment, the in-flight kitchen can comprise a worktop which divides the body into a substructure which is arranged beneath the worktop and at least one upper compartment which is arranged above the worktop. In this case, the at least one partitioning element is arranged in the substructure and/or in the upper compartment. The multi-temperature compartment can therefore be provided in a substructure and/or in an upper compartment of the in-flight kitchen.

In an alternative or additional embodiment of the in-flight kitchen, the section of the fluid duct, which comprises the partitioning wall which encompasses the specified section of the cooling and heating element, can be arranged adjacent to a rear wall of the in-flight kitchen or can be at least partially formed by the rear wall of the in-flight kitchen. The fluid duct can therefore have a separate wall which defines the fluid duct and is arranged adjacent to the rear wall of the in-flight kitchen. Alternatively, the rear wall of the in-flight kitchen can define a part of the wall of the fluid duct. In other words, in the latter embodiment the fluid duct is not formed by a completely encompassing separate wall but is delimited by this at least in the region of the rear wall of the in-flight kitchen. This enables a weight-saving production of a fluid duct in the in-flight kitchen.

In a preferred embodiment of the in-flight kitchen, the fluid duct comprises at least one fluid inlet which is formed adjacent to a rear wall of the in-flight kitchen and/or adjacent to a front side of the in-flight kitchen which lies opposite the rear wall. In other words, the in-flight kitchen comprises at least one fluid inlet through which the second fluid can flow into the fluid duct. Such a fluid inlet can be arranged in the rear wall, in a sidewall, in a ceiling or a floor of the in-flight kitchen adjacent to the rear wall or to the front side of the in-flight kitchen. Alternatively, the fluid inlet can open into a galley compartment in order to serve there for the intake of exhaust air from the galley compartment. The fluid inlet in any case forms an opening of the fluid duct to a space outside the in-flight kitchen.

The in-flight kitchen can also comprise a cooling device. The cooling device itself comprises a cooling medium circuit which is exposed to throughflow by a cooling medium and a first cooling-device fluid duct which is thermally connected to the cooling medium circuit of the cooling device in order to transfer heat from the cooling medium which circulates in the cooling medium circuit to the fluid which flows through the first cooling-device fluid duct. The cooling device also comprises a second cooling-device fluid duct which is thermally connected to the cooling medium circuit of the cooling device in order to transfer heat from a fluid which flows through the second cooling-device fluid duct to the cooling medium which circulates in the cooling medium circuit. Suitable as cooling medium is a liquid cooling medium, a gaseous cooling medium or a two-phase refrigerant which changes its aggregate state from liquid to gaseous and back inside the cooling medium circuit.

In this case, the section of the fluid duct which comprises the partitioning wall which encompasses the specified section of the cooling and heating element forms a section of the first cooling-device fluid duct upstream of the cooling device or a section of the second cooling-device fluid duct upstream of the cooling device. In other words, one side of the cooling and heating element is exposed to a flow over it by the fluid which flows through the first or second cooling-device fluid duct (is thermally connected to it) before the fluid flows through the cooling device.

The temperatures of these fluid flows correspond to the room temperature surrounding the in-flight kitchen or to the temperature of the fluid which flows through the second cooling-device fluid duct after it leaves the areas of the in-flight kitchen which are to be cooled. The room temperature can lie between +10° C. and +30° C. (in the case of a vehicle without prior climatization the room temperature can also lie appreciably below this and above this, depending on outside temperature in the environment of the vehicle). As a result, temperatures in the galley compartment of between −25° C. and +140° C. can be achieved by the temperature regulating system. The arrangement of the cooling and heating element on/in one of these fluid flows has the advantage that on this side of the cooling and heating element there is no requirement for an additional delivery device. The fluid flows are moved by a separate delivery device in order to induce a fluid for cooling the cooling medium or a fluid for cooling an in-flight kitchen area by the cooling device.

Also, the in-flight kitchen can furthermore comprise a waste heat fluid duct which is arranged downstream of the cooling device and constitutes a continuation of the first cooling-device fluid duct after the thermal connection to the cooling medium circuit of the cooling device. The in-flight kitchen also comprises a cold fluid duct which is arranged downstream of the cooling device and constitutes a continuation of the second cooling-device fluid duct after the thermal connection to the cooling medium circuit of the cooling device. The fluid which flows in the cold fluid duct serves for cooling an area of the in-flight kitchen, for example a trolley compartment.

In an alternative embodiment, the section of the fluid duct which comprises the partitioning wall which encompasses the specified section of the cooling and heating element can form a section of the waste heat fluid duct or a section of the cold fluid duct. The waste heat fluid duct is exposed to throughflow by the fluid which absorbs thermal energy in the cooling device, whereas the cold fluid duct is exposed to throughflow by the fluid which has released thermal energy to the cooling device, especially to the cooling medium of the cooling device which circulates in the cooling medium circuit. The fluid of the cold fluid duct is used for cooling galley compartments, for example trolley compartments. One side of the cooling and heating element in this embodiment variant can be exposed to flow over it by the fluid in the waste heat fluid duct or in the cold fluid duct (is thermally connected to it).

Also in this case, there is no requirement for a separate delivery device for the fluid on the side of the cooling and heating element which faces the interior of the fluid duct since the respective fluid is moved by a delivery device of the cooling device. Moreover, this embodiment, in the case of an arrangement of the temperature regulating system in the waste heat fluid duct, allows the possibility of higher temperatures (for example between +50° C. and +110° C.) to be achieved in the interior space of the galley compartment since the fluid in the waste heat fluid duct has already been heated (for example to temperatures of between +30° C. and +70° C.) as a result of the thermal connection to the cooling medium of the cooling device. Therefore, high temperatures in the interior space of the galley compartment can be achieved in an energy-efficient manner since the temperature difference between the fluid in the waste heat fluid duct and the setpoint temperature, which is to be achieved, in the interior space of the galley compartment lower than in other fluid flows. If the temperature regulating system, on the other hand, is arranged in the cold fluid duct, low temperatures (for example between −25° C. and 12° C.) can be achieved in the interior space of the galley compartment in an energy-efficient manner since the fluid in the cold fluid duct has been cooled by the cooling device (to, for example, between 0° C. and +15° C.).

Finally, the in-flight kitchen can also comprise a control unit which is designed or configured for adjusting an actual temperature in the galley compartment to a setpoint temperature by controlling the cooling and heating element. The controlling of the cooling and heating element, in the case of a thermoelectric element, is carried out via the value of the electric current flow through the thermoelectric element and also via the polarity of the electric current flow. In the case of a refrigerating machine, the controlling of the cooling and heating element is carried out via the controlling of a flow rate of the cooling medium by a delivery device and one or more valves of the refrigerating machine. The actual temperature in the galley compartment can in this case be measured by a temperature sensor which is located in the interior space of the galley compartment. The control unit can also control a delivery device which is contained in the temperature regulating system, for example the volumetric flow of the first fluid which is created by the delivery device of the temperature regulating system.

The control unit can also be connected to further temperature sensors. In this way, for example the temperature in the section of the fluid duct in which the cooling and heating element is arranged, or the room temperature in the direct vicinity of the in-flight kitchen, can be measured by corresponding temperature sensors in order to determine the required electric current for the thermoelectric element or to determine the flow rate of the cooling medium of the refrigerating machine.

The control unit can also be designed or configured for being connected to a presetting device. By such a presetting device, the setpoint temperature can be preset by a user and be made available to the control unit in the form of corresponding signals and/or data.

The control unit can be a control unit of the cooling device which adjusts the value of the fluid flows through the cooling device and also the temperature in the cold fluid duct which is to be achieved. Consequently, the control unit has already determined information for controlling the temperature regulating system, such as temperatures of the fluid flows which flow through the cooling device and also the value of the volumetric flow of the fluid (fluid quantity over time) which also flows over the side of the cooling and heating element facing the fluid duct. As a result, a space and weight reduction compared with a separate controlling of the temperature regulating system can be achieved. Also, space and weight can be saved as a result of a common presetting device for controlling the cooling device and the temperature regulating system. In addition, the control unit can also provide a read-out device of radio frequency tags in order to read out and to process information from radio frequency tags which are attached to products which are to be stored in the galley compartment and to control the temperature regulating system in accordance with the processed information.

A temperature regulating system described above and/or a galley compartment described above and/or an in-flight kitchen described above is/are especially advantageously suitable for use in an aircraft.

BRIEF DESCRIPTION OF THE DRAWINGS

All aspects, variants, examples of a temperature regulating system, of a galley compartment and of an in-flight kitchen which are described above are not be considered as being isolated from each other. Rather, all these aspects, variants, examples, etc. can be combined in any way with each other. Preferred embodiments of the disclosure herein are now explained in more detail with reference to the attached schematic and example drawings. In the drawings:

FIGS. 2A and 2B show a perspective view of a temperature regulating system; and

DETAILED DESCRIPTION

Figure 1:
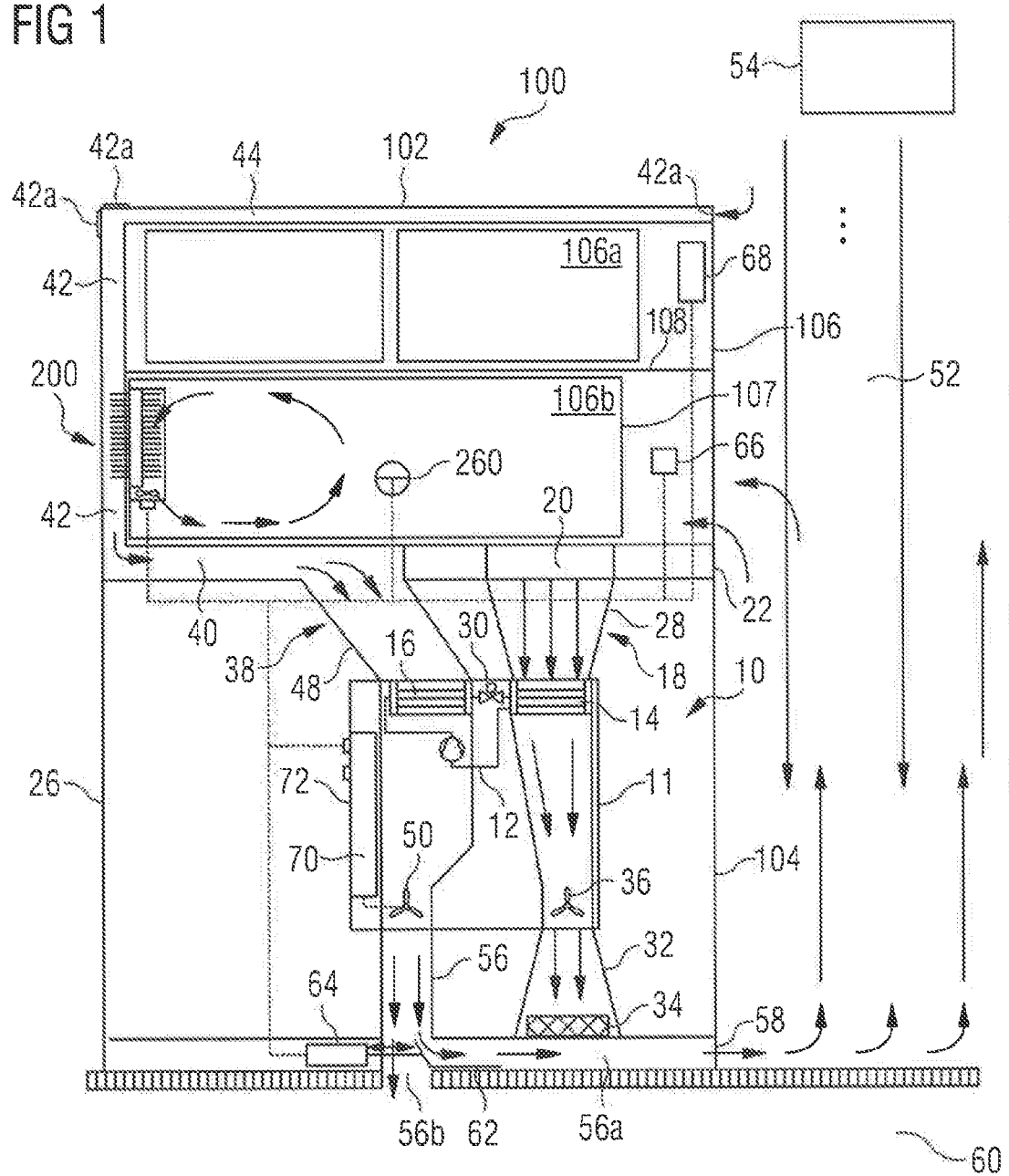
FIG. 1 shows an in-flight kitchen, which is equipped with a first embodiment of a temperature regulating system.

FIG. 1 shows an in-flight kitchen generally designated 100, which is suitable especially for installing in a passenger cabin of a passenger aircraft. The in-flight kitchen 100 comprises a body 102 with a substructure 104 and also upper compartments 106 which are arranged above the substructure 104. Stored in the upper compartments 106 are kitchen appliances such as coffee machines, water boilers, etc., and also drinks and foodstuff. Arranged in the substructure 104 of the in-flight kitchen 100, on the other hand, is a trolley compartment for accommodating mobile trolleys which are loaded with objects such as drinks and foodstuffs which are provided for handing out to the passengers in the passenger cabin of the passenger aircraft. A cooling system generally designated 10 serves for cooling the trolley compartment which is arranged in the substructure 104 of the in-flight kitchen 100.

The cooling system 10 comprises a cooling device 11 with a cooling medium circuit 12 which is exposed to through-flow by a cooling medium, for example a two-phase refrigerant. An evaporator 14 and a condenser 16 are arranged in the cooling medium circuit 12. When flowing through the evaporator 14, the cooling medium which flows through the cooling medium circuit 12 absorbs heat and in the process transfers from the liquid into the gaseous aggregate state. In contrast to this, the cooling medium which flows through the cooling medium circuit 12 is cooled when flowing through the condenser 16 as a result of release of heat energy and is converted from the gaseous back into the liquid aggregate state again. The cooling device 11 is integrated into an intermediate wall 17 which divides the substructure 104 of the in-flight kitchen 100 into a first and a second section. Alternatively, the cooling device 11 can also be installed in a sidewall of the in-flight kitchen 100 or in a rear wall 26 of the in-flight kitchen.

The cooling device 11 comprises a first fluid duct generally designated 38 and a second fluid duct generally designated 18 which in each case are thermally connected to the cooling medium circuit 12 of the cooling device 11. The fluid flows which are created by the cooling device 11, for example in the first cooling-device fluid duct 38 or second cooling-device fluid duct 18 and also in ducts which are arranged downstream of the cooling device 11, can be used for a temperature regulating system generally designated 200. Shown in FIG. 1 by way of example is such a temperature regulating system 200 which is arranged in a section 42 of the first cooling-device fluid duct 38. The temperature regulating system 200 serves for temperature regulation in the interior space of a galley compartment 106b.

Figure 2B:
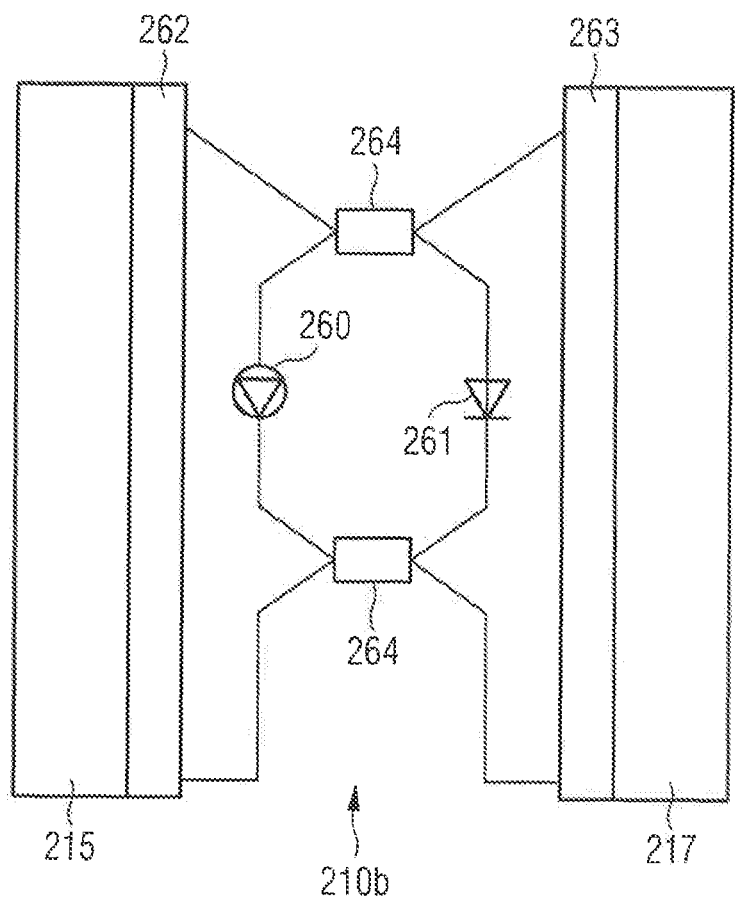

To this end, the temperature regulating system, as is shown in detail in FIGS. 2A and 2B, has a cooling and heating element 210 and a heat-insulating partitioning wall 220 which at least partially adjoins an encompassing side edge of the cooling and heating element 210 and encloses a specified section of the cooling and heating element. As a result, the heat-insulating partitioning wall 220 separates an interior space of the galley compartment 106b from the interior of the section 42 of the first cooling-device fluid duct 38. The cooling and heating element 210 of flat design therefore has a side facing the interior of the first cooling-device fluid duct 38 and a side facing the interior space of the galley compartment 106b.

In the embodiment variant shown in FIG. 2A, the cooling and heating element 210a is a thermoelectric element 210a. The thermoelectric element 210a, when a voltage is applied, creates a heat flow from one side (for example from the side facing the interior of the first cooling-device fluid duct 38) to an opposite side (for example to the side facing the interior space of the galley compartment 106b).

Alternatively to this, the cooling and heating element 210 can also be designed in the form of a refrigerating machine generally designated 210b, as is shown by way of example and schematically as a sectional view in FIG. 2B. The refrigerating machine 210b comprises a delivery device 260 for a cooling medium of the refrigerating machine 210b (such as compressor), a restrictor valve or expansion valve 261, a first heat exchanger 262, a second heat exchanger 263 and at least one valve 264 (for example a (multi) directional valve) for altering the direction of the cooling medium volumetric flow downstream of the at least one valve 264. Via the at least one valve 264, a volumetric flow of the cooling medium which is moved by the delivery device 260 in the refrigerating machine 210b can be controlled so that the refrigerating medium flows from the delivery device 260 either to the first heat exchanger 262 (first valve position) or the second heat exchanger 263 (second valve position). Correspondingly, the refrigerating medium flows from the first heat exchanger 262 to the restrictor valve 261 in the first valve position, and in the second valve position flows from the second heat exchanger 263 to the restrictor valve 261.

For example, as shown in FIG. 2B, the refrigerating machine 210b can comprise two valves 264. In a first position of the valves 264, the cooling medium flows from the delivery device 260 through the lower valve 264 (at the bottom in FIG. 2B) into the first heat exchanger 262. From the upper end of the heat exchanger 262, the cooling medium flows further into the upper valve 264, from there flows towards the restrictor valve or expansion valve 261, through the lower valve 264, and also flows from the bottom upwards through the second heat exchanger 263. In the upper valve 264, the flows of the cooling medium therefore cross over, whereas in the lower valve 264 the cooling medium flows flow past each other in parallel. In the reverse position of the valves 264 (second valve position), the cooling medium flows from the heat exchangers 262, 263 flow past each other in parallel in the upper valve 264 and in the lower valve 264 cross over.

The heat exchangers 262 and 263 therefore achieve the same function as the two sides of the thermoelectric element 210a from FIG. 2A. Instead of changing the polarity of the voltage which is applied to the thermoelectric element 210a, in the case of the refrigerating machine 210b, by controlling (changing the valve positions) of the at least one valve 264, the direction of a heat flow between the two heat exchangers 262, 263 can be reversed.

A first heat exchanger 215 and a second heat exchanger 217 can be arranged on one of or both of these sides of the cooling and heating element 210. The temperature regulating system 200 can also comprise a delivery device 230 which is arranged on a side of the cooling and heating element 210 facing the interior space of the galley compartment 106b. The delivery device 230 is designed or configured for delivering a first fluid, which is present in the galley compartment 106b, via the cooling and heating element 210 and/or via the heat exchanger 217 which is attached on this side of the cooling and heating element 210. Since a fluid flow, created by the cooling device, exists on the side of the cooling and heating element 210 facing away from the interior space of the galley compartment 106b, a separate delivery device is unnecessary on the side of the cooling and heating element 210 facing this fluid flow. This allows a saving of weight and space of the temperature regulating system 200.

The temperature regulating system 200 can also comprise a control unit 240 which can apply a variable voltage to the thermoelectric element 210 and can change the polarity of this voltage. Alternatively, the control unit 240 can control the delivery device 260 of the refrigerating machine 210b and/or the at least one valve 264. As a result, a heat flow between the two sides of the cooling and heating element can be controlled in its value and direction. Depending on the polarity of the voltage or position of the at least one valve 264, by the cooling and heating element 210 heat from the interior of the section 42 of the first cooling-device fluid duct 38 is therefore transported into the interior space of the galley compartment 106b or in the reverse direction.

As is shown in FIG. 1, the first cooling-device fluid duct 38 is exposed to throughflow by a second fluid. In the exemplary embodiment shown in FIG. 1, the second fluid is air. The first cooling-device fluid duct 38 is thermally connected via the condenser 16 to the cooling medium circuit 12 of the cooling device 11 in order to transfer heat from the cooling medium which circulates in the cooling medium circuit 12 to the fluid which flows through the first cooling-device fluid duct 38. The second fluid is therefore used for the cooling of cooling medium which circulates in the cooling medium circuit 12.

The first cooling-device fluid duct 38 comprises a first section 40 which is integrated in an installation-space saving manner into a worktop 22 of the in-flight kitchen 100. The worktop 22 separates the substructure 104 of the in-flight kitchen 100 from the upper compartments 106 of the in-flight kitchen 100. A second section 42 of the first cooling-device fluid duct 38 adjoins (upstream) the first section 40 and extends for example adjacent to a rear wall 26 of the in-flight kitchen 100. The second section 42 of the first cooling-device fluid duct 38 is provided with one, or a plurality of, fluid inlet(s) 42a. Such a fluid inlet 42a can be formed adjacent to the rear wall 26 of the in-flight kitchen 100. Additionally or alternatively, a fluid inlet 42a can be arranged adjacent to a front side of the in-flight kitchen 100 which lies opposite the rear wall 26 of the in-flight kitchen 100 and via a third section 44 of the first cooling-device fluid duct 38 can be connected to the second section 42. Also alternatively or additionally, a fluid inlet 42a can be arranged in a roof area of the in-flight kitchen 100. Also alternatively or additionally, a fluid inlet (not shown) can also open into a further galley compartment, as a result of which air discharged from the galley compartment. Each of the possible air inlets 42a can be provided with an air filter in order to reduce or to avoid contamination of the adjoining fluid duct sections.

Via the one, or the plurality of, fluid inlet(s) 42a, air can therefore be discharged from an environment of the in-flight kitchen 100 and be ducted as the second fluid through the first cooling-device fluid duct 38. The air surrounding the in-flight kitchen can originate for example from a cabin area 52, to which is fed cold climatization air from an aircraft climatization system 54 at a temperature of approximately 12° C. Therefore, the fluid flow in the first cooling-device fluid duct 38 has a corresponding temperature and is well suited as a heat sink.

The first cooling-device fluid duct 38 also comprises a fourth section 48 which, with regard to the flow direction of the second fluid through the first cooling-device fluid duct 38, is arranged downstream of the first section 40 and consequently connects the first section 40 of the first cooling-device fluid duct 38 to the cooling device 11, i.e. to a section of the first cooling-device fluid duct 38 which is thermally connected to the cooling medium circuit 12 of the cooling device 11. In the arrangement according to FIG. 1, the fourth section 48 of the first cooling-device fluid duct 38 opens into the cooling device 11 in the region of the upper side 30 of the cooling device 11 facing the worktop 22.

For delivering the second fluid through the first cooling-device fluid duct 38, a delivery device 50 can be designed in the form of a fan. For delivering the second fluid through the first cooling-device fluid duct 38, the delivery device 50 is integrated into the cooling device 11 in the exemplary embodiment shown here. By this delivery device 50, a separate delivery device for the temperature regulating system 200 is not required, as a result of which space and weight are saved.

The first cooling-device fluid duct 38, with regard to the flow direction of the fluid, i.e. the air, through the first cooling-device fluid duct 38, is continued downstream of the thermal connection of the first cooling-device fluid duct 38 to the cooling medium circuit 12 of the cooling device 11 by a waste heat fluid duct 56. The waste heat fluid duct 56 can be connected to a cabin area 52 of the aircraft which accommodates the in-flight kitchen 100 in order to feed warmed air to the cabin area 52 by heat transfer of the cooling medium which circulates in the cooling medium circuit 12 of the cooling device 11. The warm air which flows through the first cooling-device fluid duct 38 can therefore be used for heating the cabin area 52.

To this end, the waste heat fluid duct 56 branches into a first section 56a and a second section 56b. The first section 56a of the waste heat fluid duct 56 opens into an air outlet 58 which is arranged in the region of a front side of the in-flight kitchen 100, via which outlet the warm air which flows through the waste heat fluid duct 56 can be ducted into the cabin area 52 close to the floor. Via the second section 56b, the waste heat fluid duct 56 can be connected on the other hand to a cargo area 60 of the aircraft so that the warm air which flows through the waste heat fluid duct 56 can also be fed to the cargo area 60 of the aircraft. A valve 62 is arranged in the waste heat fluid duct 56 in the region of the branch of the waste heat fluid duct 56 into the first and the second sections 56a, 56b. The valve 62 is designed or configured for conducting the volumetric flow of the warm air which flows through the waste heat fluid duct 56 into the cabin area 52 which accommodates the in-flight kitchen 100 and/or into the cargo area 60, as desired. In the embodiment shown in FIG. 1, the valve 62 is designed in the form of a flap which can be operated by a controllable actuator 64. Depending on the position of the valve 62, the warm air which flows through the waste heat fluid duct 56 can be selectively ducted either just into the cabin area 52 or just into the cargo area 60. Alternatively to this, the airflow which flows through the waste heat fluid duct 56 can, however, also be divided by the valve 62 into partial volumetric flows which, depending on requirement, can then be fed to the cabin area 52 and to the cargo area 60.

The second cooling-device fluid duct 18 is exposed to throughflow by a third fluid, which is to be cooled, by the cooling device 11. In the exemplary embodiment shown in FIG. 1, the third fluid is air, i.e. the cooling device 11 is designed in the form of an air chiller. The second cooling-device fluid duct 18 is thermally connected via the evaporator 14 to the cooling medium circuit 12 of the cooling device 11 in order to transfer heat from the third fluid, which flows through the second cooling-device fluid duct 18, to the cooling medium which circulates in the cooling medium circuit 12. The third fluid is therefore cooled to a desired low temperature when flowing through the evaporator 14.

The second cooling-device fluid duct 18 comprises a first section 20 which is integrated in an installation-space saving manner into the worktop 22 of the in-flight kitchen 100. The first section 20 of the second cooling-device fluid duct 18 is provided with a plurality of fluid inlets which are formed in an underside of the worktop 22 facing the substructure 104 of the in-flight kitchen 100. The first section 20 of the second cooling-device fluid duct 18 is connected to a second section 28 of the second cooling-device fluid duct 18 which opens into the cooling device 11 in the region of an upper side 30 of the cooling device 11 facing the worktop 22 and as a result creates a connection between the first section 20 of the second cooling-device fluid duct 18 and a section of the second cooling-device fluid duct 18 which is thermally connected via the evaporator 14 to the cooling medium circuit 12 of the cooling device 11.

A cooling fluid duct 32 connects the cooling device 11 to a fluid outlet 34 which opens into the substructure 104 of the in-flight kitchen 100. The third fluid which is cooled by the cooling device 11 can therefore be ducted via the cooling fluid duct 32 into an area of the substructure 104 close to the floor and via the first section 20 and then the second section 28 of the second cooling-device fluid duct 18 can be recirculated into the cooling device 11. The flow direction of the third fluid, which is cooled by the cooling device 11, through the cooling fluid duct 32 and the second cooling-device fluid duct 18 can also be reversed, however.

A delivery device 36 delivering the third fluid through the cooling fluid duct 32 and the second cooling-device fluid duct 18 can be designed or configured for example in the form of a fan and is integrated into the cooling device 11 in the exemplary embodiment shown here. In particular, the delivery device 36 for delivering the third fluid through the cooling fluid duct 32 and the second cooling-device fluid duct 18 is arranged downstream of the thermal connection of the second cooling-device fluid duct 18 to the evaporator 14 of the cooling device 11 with regard to the flow direction of the third fluid.

A temperature regulating system 200 can be arranged in any section of the above-described first cooling-device fluid duct 38, second cooling-device fluid duct 18, waste heat fluid duct 56 and cooling fluid duct 32. In other words, the cooling and heating element 210 of the temperature regulating system 200 can use any of the fluid flows provided in these fluid ducts as a heat source or heat sink or in order to cool or to heat a galley compartment 106b or another area of the in-flight kitchen 100.

In the exemplary embodiment shown in FIG. 1, a galley compartment 106b is arranged in an upper compartment 106 of the in-flight kitchen 100. In this case, the temperature regulating system 200 by its partitioning wall 220 forms a rear side of the galley compartment 106b. As can be gathered from FIG. 1, the temperature regulating system 200 could alternatively or additionally form a part of a floor of the galley compartment 106b, wherein the cooling and heating element 210 would lie in the section 40 of the first cooling-device fluid duct 38. By the same token, the temperature regulating system 200 can be arranged at any further optional location of the galley compartment 106b.

Furthermore, an additional temperature regulating system 200 can also be arranged in the in-flight kitchen and cools or heats the same galley compartment 106b but is thermally connected to another section of the fluid duct or to another fluid duct. For example, the cooling and heating element 210 of a first temperature regulating system 200 for heating a galley compartment 106b can lie in the section 40 of the first cooling-device fluid duct 38, whereas a cooling and heating element 210 of a second temperature regulating system (not shown in FIG. 1) for cooling the galley compartment 106b lies in the section 20 of the second cooling-device fluid duct 18. Alternatively or additionally, a pure heating element (for example an electric heating element) can also be installed for heating the galley compartment 106b.

By the same token, the temperature regulating system 200 in the substructure 104 of the in-flight kitchen 100 can cool or heat a galley compartment (not explicitly shown). For this, the cooling and heating element 210 can be arranged in/on one of the sections 48, 28 of the first or second cooling-device fluid ducts 38, 18 or also in/on one of the sections of the waste heat fluid duct 56 and cooling fluid duct 32.

On a front side of the galley compartment 106b facing the in-flight kitchen 100, provision is made for a door 107 for closing off an opening of the galley compartment 106b. As a result of heat insulation properties of the door 107, the interior space of the galley compartment 106b can be temperature-regulated by the temperature regulating system 200 in an energy-efficient manner. The remaining parts of the galley compartment 106b, such as sidewalls, floor or ceiling, can be formed by partitioning elements 108 of the in-flight kitchen 100. Alternatively to this, the galley compartment 106b can comprise a complete body which rests on a partitioning element 108 which forms a bottom of the upper compartment 106.

In both cases, the galley compartment 106b and/or the temperature regulating system 200 comprises an electric connecting element generally designated 250. This electric connecting element 250 serves for connecting the temperature regulating system 200 to an electric current source (not shown) and/or to a control device 70.

For controlling the temperature regulating system 200, a first presetting unit 66 is arranged on, or in the proximity of, the door 107. By this presetting unit 66, a setpoint temperature for the interior space of the galley compartment 106b can be preset (adjusted) by a user. The presetting unit 66 can be put into effect by pushbuttons, rotary selector switches, an indicator element and the like.

In an alternative or additional embodiment, an individual or second presetting unit 68 in the form of a manually operable interface is attached at an optional position on the front side of the in-flight kitchen 100. By this interface, parameters of the cooling system 10 can be selected and/or set by a user, e.g. for presetting a setpoint temperature in the trolley area 104. For the case in which the presetting unit 68 is the single presetting device, a setpoint temperature for the interior space of the galley compartment 106b can additionally also be preset by the presetting unit 68.

Furthermore, a temperature sensor 260 can be arranged in the interior space of the galley compartment 106b. This temperature sensor 260 measures an actual temperature of the first fluid in the interior space of the galley compartment 106b.

Signals emitted from the first presetting device 66, the second presetting unit 68 and/or the temperature sensor 260 are fed to an electronic control unit 70. The electronic control unit 70 is designed or configured for controlling the operation of the temperature regulating system 200 and also of the cooling device 11. As a result, the temperature regulating system 200 can be integrated as a (further) control element of the controlling of the cooling system 10, as a result of which only a data or signal line (bus) is required between the control unit 70 and the temperature regulating system 200.

Alternatively, the temperature regulating system 200 can also be equipped with a separate control unit 240. In this case, the control unit 240 would receive corresponding signals from the first presetting device 66, from the second presetting device 68 and/or from the temperature sensor 260 and correspondingly control the cooling and heating element 210 in order to set a desired setpoint temperature in the interior space of the galley compartment 106b.

The control unit 70 and/or the control unit 240 can also control the valve 62 which is arranged in the waste heat fluid duct 56 and the operation of the delivery device 50 for delivering the second fluid through the first cooling-device fluid duct 38 in dependence of signals which are emitted to the presetting device 66 and/or the presetting device 68, that is to say in dependence of the established setpoint temperature in the galley compartment 106b. Depending on the arrangement of the temperature regulating system 200, a suitable volumetric flow of the fluid, which serves as a heat source or heat sink for the cooling and heating element 210, can consequently be set.

Figure 3A:
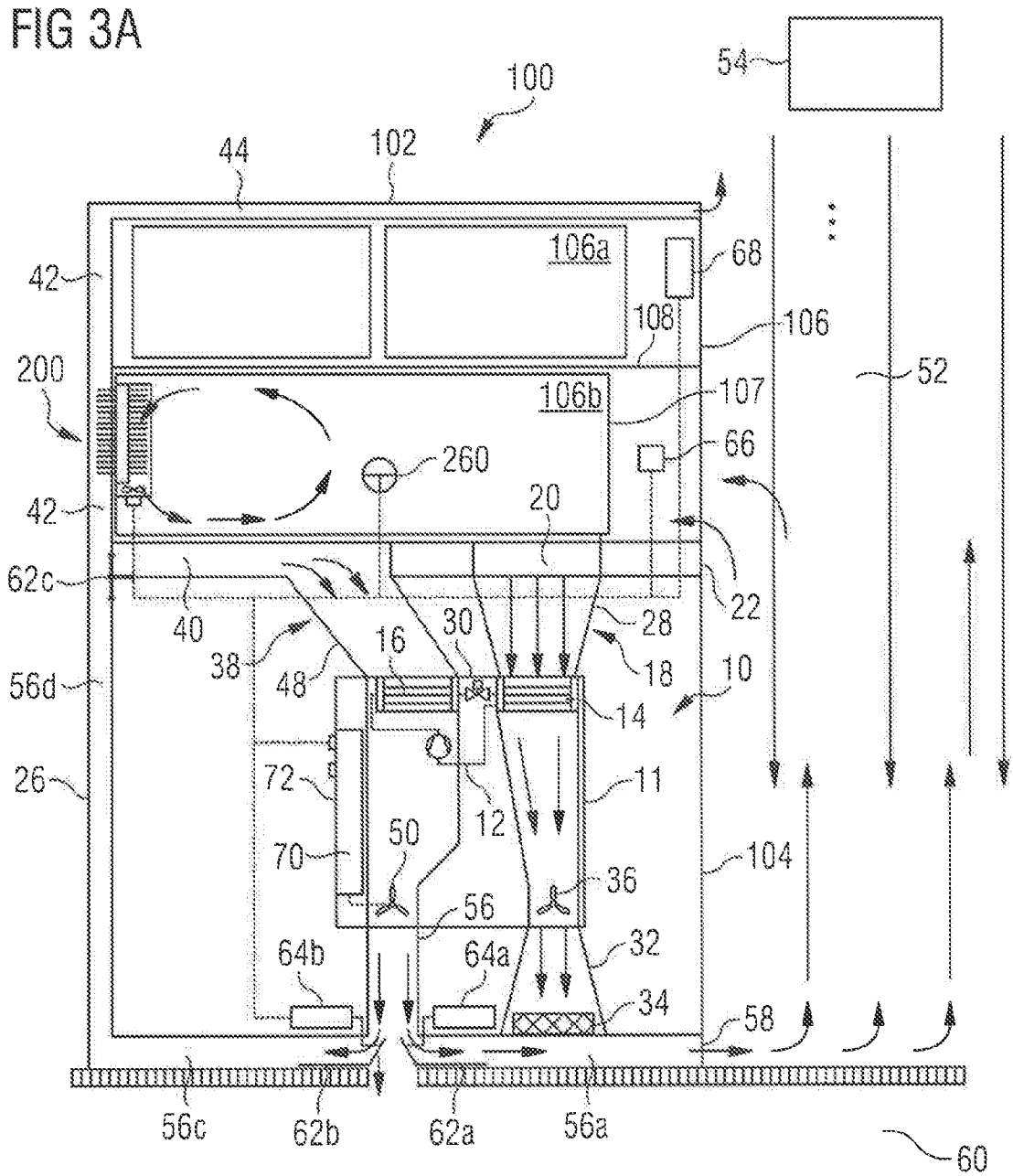
FIGS. 3A through 3C show an alternative embodiment of an in-flight kitchen, which is equipped with a temperature regulating system.

The in-flight kitchen 100 shown in FIG. 3 differs from the arrangement according to FIG. 1 especially by the fact that the waste heat fluid duct 56 comprises a third section 56c and also a fourth section 56d. The third section 56c of the waste heat fluid duct 56 leads in the floor region of the in-flight kitchen 100 to its rear wall 26, whereas the fourth section 56d of the waste heat fluid duct 56 leads upwards adjacent to the rear wall 26 of the in-flight kitchen 100. Arranged next to the first valve 62a, which can be controlled by the actuator 64a, is a second valve 62b, for example in the form of a flap which can be controlled by a second actuator 64b. The second valve 62b is preferably mirror-symmetrical to the first valve 62a and can be moved separately or together with the first valve 62a. As a result, at least a partial volumetric flow of the fluid flow in the waste heat fluid duct 56 can be ducted into the third section 56c and therefore also into the fourth section 56d of the waste heat fluid duct 56.

A third valve 62c is also arranged at the end of the fourth section 56d of the waste heat fluid duct 56, as seen downstream. The third valve 62c, which for example can be designed as a rotatable flap, enables, in a first position shown in FIG. 3B, a connection between the fourth section 56d of the waste heat fluid duct 56 and the second section 42 of the first cooling-device fluid duct 38, as a result of which the first section 40 and second section 42 of the first cooling-device fluid duct 38 are isolated. In a second position, shown in FIG. 3c, of the third valve 62c, the fourth section 56d of the waste heat fluid duct 56 is closed and the first section 40 and second section 42 of the cooling-device fluid duct 38 are interconnected. The position of the third valve 62c can be altered by an actuator (not shown) which is controlled by the control unit 70 or control unit 240.

Consequently, the second fluid which is heated in the cooling device 11 can be ducted from the waste heat fluid duct 56 into the second section 42 (and also third section 44) of the first cooling-device fluid duct 38 in the upper compartment 106 of the in-flight kitchen 100. The one, or the plurality of, fluid inlet(s) 42a shown in FIG. 1 would in this case serve as an air outlet, or outlets. Therefore, heated fluid (heated air) can be fed to a temperature regulating system 200 which is arranged in the section 42 of the first cooling-device fluid duct 38. As a result, an energy-efficient heating of the galley compartment 106b by the cooling and heating element 210 can be achieved. Depending on the position of the second valve 62b and the third valve 62c, cooler ambient air (or galley compartment exhaust air) or heated exhaust air of the cooling device 11 can therefore be ducted to the cooling and heating element 210.

Figure 3B:
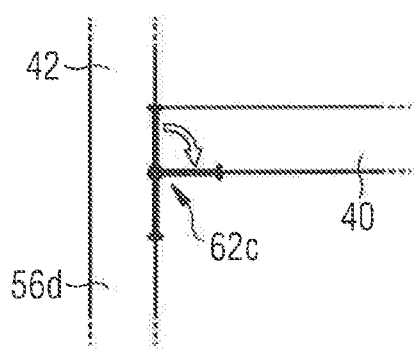
Figure 3C:
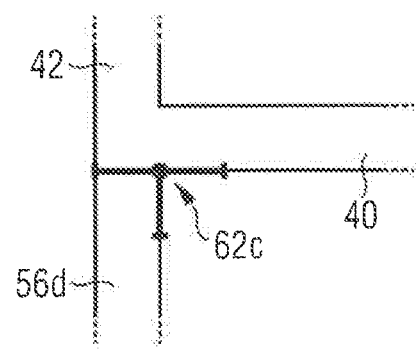

If the third valve 62c in its first position, shown in FIG. 3B, isolates the first section 40 from the second section 42 of the first cooling-device fluid duct 38, the first section 40 of the first cooling-device fluid duct 38 has to be connected via other fluid ducts and/or fluid inlets (not shown) to the environment of the in-flight kitchen 100 in order to be able to provide a sufficient volumetric flow for cooling of the cooling medium in the cooling medium circuit 12. For example, a plurality of second sections 42 of the first cooling-device fluid duct 38 can be arranged next to each other (above and below the plane of the illustration in FIG. 3) and all meet in the first section 40 of the first cooling-device fluid duct 38. The third valve 62c would isolated only one of these second sections 42 of the first cooling-device fluid duct 38 from the first section 40 so that via the remaining second sections 42 fluid can continue to be drawn in and conducted through the cooling device 11.

The subject matter disclosed herein can be implemented in software in combination with hardware and/or firmware. For example, the subject matter described herein can be implemented in software executed by a computer processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A temperature regulating system for at least one galley compartment for an in-flight kitchen which is intended for installing in a transport apparatus or vehicle, wherein the temperature regulating system comprises:
   a controllable cooling and heating element, which is configured for selectively cooling or heating a specified section of the cooling and heating element, the cooling and heating element comprising at least a thermoelectric element or a refrigerating machine;
   a heat-insulating partitioning wall, which at least partially adjoins an encompassing side edge of the cooling and heating element and encloses the specified section of the cooling and heating element;
   a delivery fan configured to control a speed at which a first fluid, present in the galley compartment, is delivered via the section of the cooling and heating element; and
   a controller configured to control temperature inside of the at least one galley compartment;
   the galley compartment having a heat-insulating door for closing off an opening of the galley compartment, wherein a first presetting device, in communication with the controller, is on, or in a proximity of, the heat-insulating door for presetting a setpoint temperature for the interior space of the galley compartment;
   wherein the heat-insulating partitioning wall is configured for separating an interior space of the galley compartment from an interior of a section of a fluid duct which extends in the in-flight kitchen; and
   either of:
      wherein the controller is configured to control temperature inside of the at least one galley compartment based on readings from radio frequency tags stored in the at least one galley compartment;
      wherein the controllable cooling and heating element is a thermoelectric element and the controller is configured for applying a variable voltage to the thermoelectric element and changing a polarity of the voltage; or
      wherein the controllable cooling and heating element is a refrigerating machine with two heat exchangers, ducts for a cooling medium and at least one valve in the ducts, wherein the controller is configured for controlling the at least one valve of the refrigerating machine so that the cooling medium is selectively ducted through one of the two heat exchangers for heat absorption or heat release.

2. The temperature regulating system according to claim 1, wherein the delivery fan is on a side of the partitioning wall facing the interior space of the galley compartment.

3. The temperature regulating system according to claim 1, further comprising:
   a first heat exchanger, which is on a side of the cooling and heating element facing the section of the fluid duct; and/or
   a second heat exchanger, which is on a side of the cooling and heating element facing the interior space of the galley compartment.

4. The temperature regulating system according to claim 1, wherein the transport apparatus or vehicle comprises an aircraft.

* * * * *